United States Patent [19]

Dillman et al.

[11] Patent Number: 4,524,265

[45] Date of Patent: Jun. 18, 1985

[54] MECHANICAL ACREAGE COUNTER

[76] Inventors: Thomas G. Dillman, R.R. 3, Grinnell, Iowa 50112; Glen W. Dillman, R.R. 1, P.O. Box 33, Gilman, Iowa 50106

[21] Appl. No.: 570,248

[22] Filed: Jan. 12, 1984

[51] Int. Cl.³ .............................................. G01C 22/00
[52] U.S. Cl. .............................. 235/95 R; 235/117 R; 235/103; 111/1; 74/397; 74/421 R
[58] Field of Search ...... 235/61 L, 61 M, 95 R–95 B, 235/96, 97, 117 R, 103; 221/2, 7, 8; 111/1, 51; 74/396, 397, 412, 421 R; 33/185 V

[56] References Cited

U.S. PATENT DOCUMENTS

| | | | |
|---|---|---|---|
| 308,632 | 12/1884 | See | 235/95 R |
| 2,959,975 | 11/1960 | Lingel | 74/397 X |
| 3,104,632 | 9/1963 | Crump | 111/1 |
| 3,137,073 | 6/1964 | Rawlinson | 235/95 R X |
| 3,422,776 | 1/1969 | Gregory, Jr. | 111/51 |
| 3,912,121 | 10/1975 | Steffen | 221/13 |
| 4,296,313 | 10/1981 | Horner et al. | 235/61 L |

Primary Examiner—Benjamin R. Fuller
Attorney, Agent, or Firm—Zarley, McKee, Thomte, Voorhees & Sease

[57] ABSTRACT

The mechanical acreage counter of the present invention is connected to a shaft of a planter unit which rotates only when seed is being planted therefrom. The counter includes a first gear connected to the shaft for rotation therewith, a bracket adjustably connected to the framework of the planter unit, and an odometer having a second gear in meshing combination with the first gear for sequentially rotating the numbered wheels within the odometer. The two gears are always in mesh so as to minimize wear upon the counter and to improve accuracy thereof.

7 Claims, 8 Drawing Figures

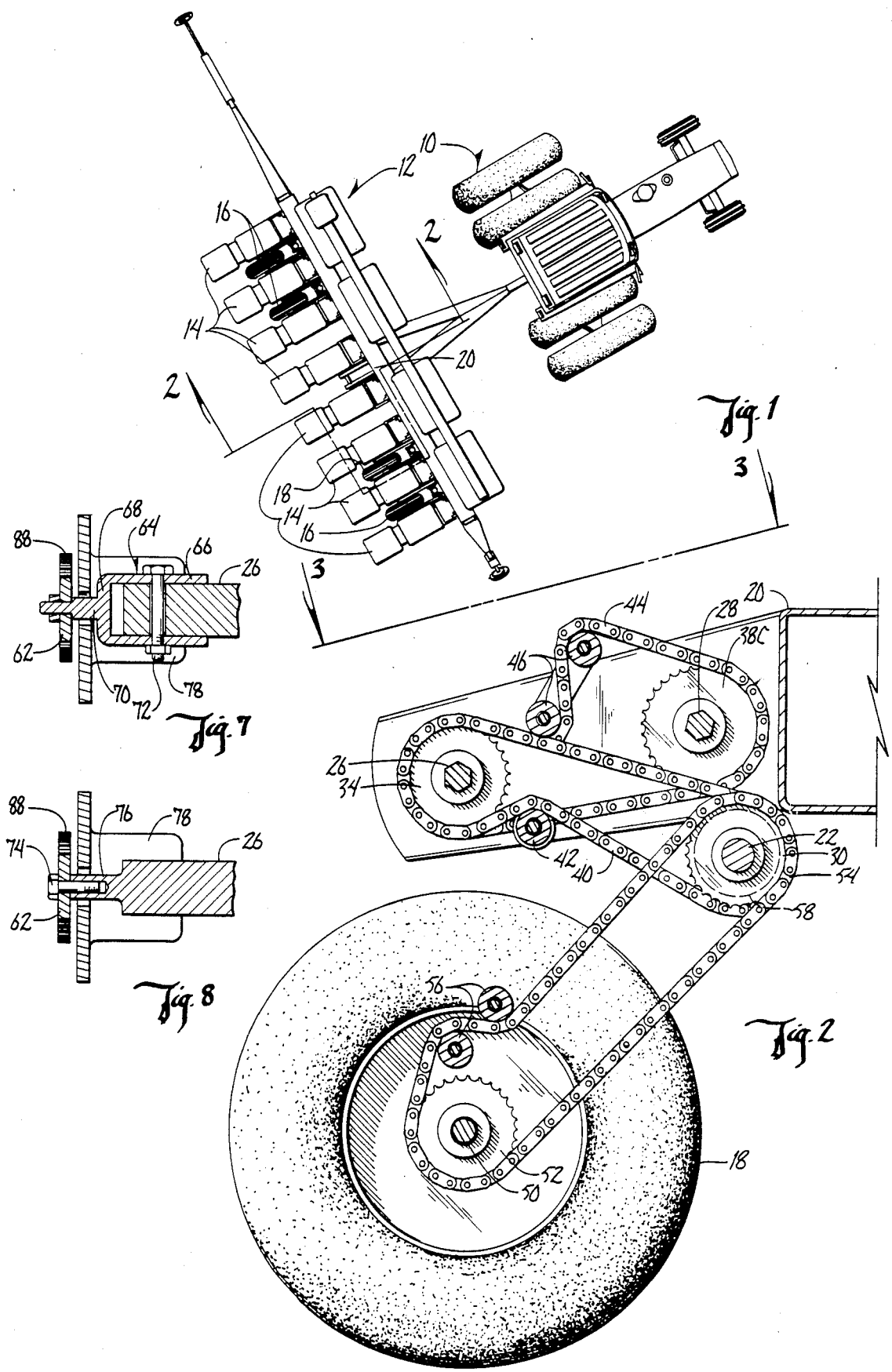

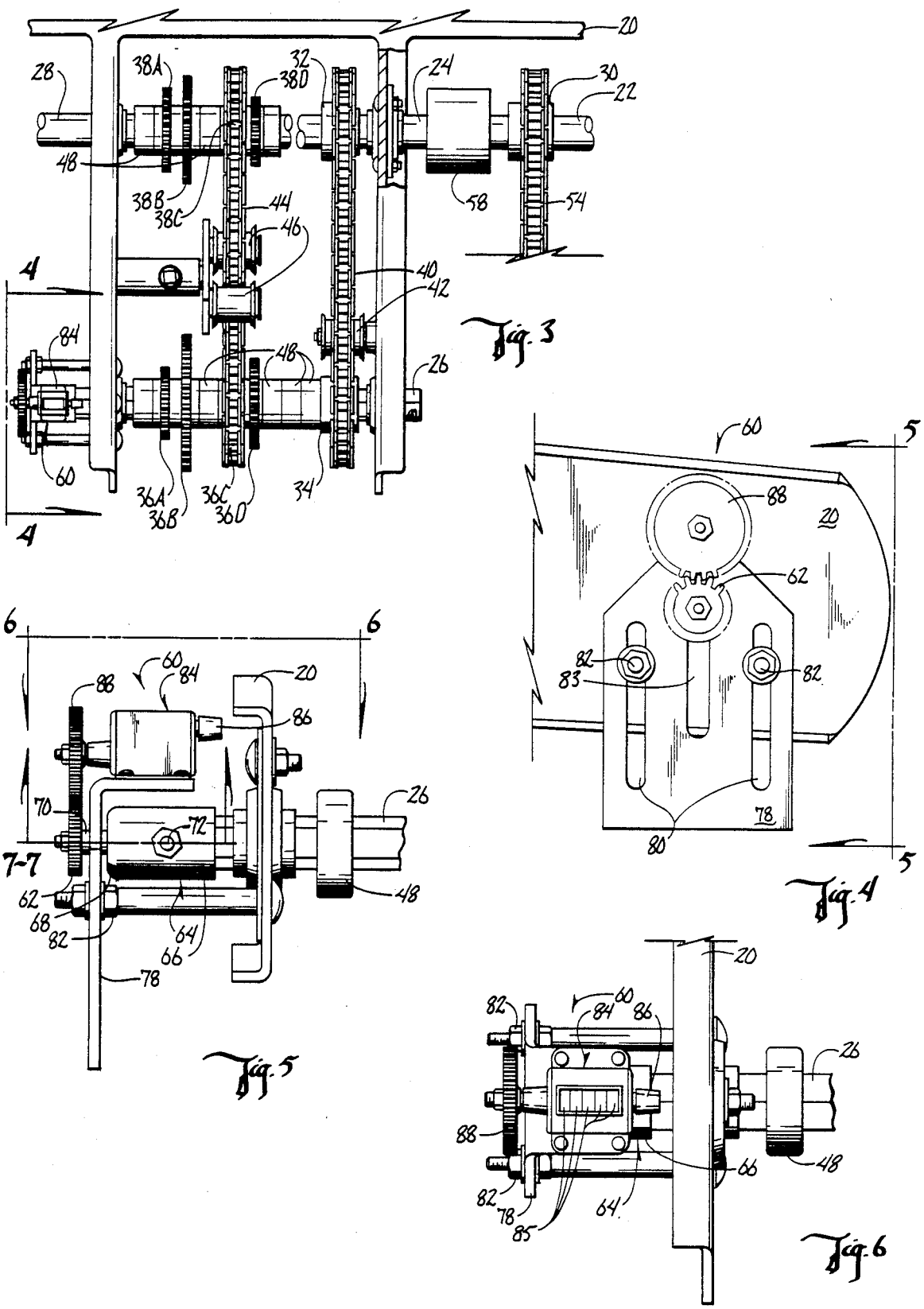

MECHANICAL ACREAGE COUNTER

BACKGROUND OF THE INVENTION

It is often desirable for a farmer to know how many acres have been planted with seeds at various times during the planting operation. In contrast to counting the number of seeds deposited during the planting operation, which generally is accomplished through electronic counting devices, the counting of acres planted can be done mechanically by measuring the linear distance traveled by the agricultural planter and multiplying by the width of the total number of rows planted.

An example of a typical acreage counter is the "Meter-Man" which is often used on John Deere planters. The Meter-Man counter utilizes a first gear connected to the primary drive shaft of the planting unit which is driven by the drive wheel of the unit. When planting, a second gear mounted on the drive wheel bracket and connected to an odometer is in mesh with the first gear such that the odometer registers the number of acres planted. In operation, the drive shaft is in a lowered position such that seeds can be deposited from their bins onto the ground. However, when it is desirable to transport the planting unit without seeds being deposited from their bins, the toolbar is raised which in turn raises the primary drive shaft. This lowering and raising of the drive shaft moves the first gear into and out of meshing combination with the second gear of the Meter-Man counter, respectively. Such repeated engagement and disengagement of the gears causes excessive wear and hastens failure of the counter. Also, the primary drive shaft of the planting unit rotates at a faster speed than other shafts in the power train or transmission of the planter. The relatively high rotational speed of the drive shaft also increases wear on the Meter-Man counter which can lead to inaccuracies and failure.

Therefore, a primary objective of the invention is the provision of an improved acreage counter.

A further objective of the present invention is the provision of a mechanical acreage counter which is subjected to minimum wear.

A still further objective of the present invention is the provision of an acreage counter having gears which remain in meshing combination at all times.

Another objective of the present invention is the provision of an acreage counter in which the gear ratios can be altered to accomodate various row widths as well as various numbers of rows.

A further objective of the present invention is the provision of a mechanical acreage counter which is easy to install on a planter and which is accurate and durable in use.

SUMMARY OF THE INVENTION

A mechanical counter is provided for use on a seed planter to determine the number of acres of planted seed. The counter has a first gear connected to one of the secondary shafts of the transmission of the planter unit for rotation therewith when the clutch of the planter is engaged. A second gear, which is always in mesh with the first gear, is connected to a read-out odometer unit which registers the number of acres of seed planted. In operation, the clutch is engaged to cause seeds to be deposited from the planter seed bins. When the clutch is engaged, the shaft upon which the first gear is mounted rotates along with the first gear mounted thereon, thereby rotating the second gear to produce a read-out on the odometer. When the clutch is disengaged, seed is not deposited from the planter bins, and the shaft to which the first gear is mounted does not rotate. Thus, when no seeds are being planted, no gears are turning and the odometer is not advancing. The number of teeth on the first gear can be varied to accommodate various row widths and various numbers of rows planted by the planter unit.

BRIEF DESCRIPTION OF THE DRAWINGS

FIG. 1 is a top plan view of a planter unit connected to an agricultural tractor.

FIG. 2 is a side elevational view of the drive train of the planter unit.

FIG. 3 is a view taken along line 3—3 of FIG. 2.

FIG. 4 is a view taken along line 4—4 of FIG. 3 showing a side elevational view of the acreage counter.

FIG. 5 is a view taken along line 5—5 of FIG. 4 showing a front elevational view of the acreage counter.

FIG. 6 is a view taken along line 6—6 of FIG. 5 and shows a top plan view of the acreage counter.

FIG. 7 is a view taken along line 7—7 of FIG. 5 showing the connection of the first gear to the secondary shaft of the drive train.

FIG. 8 is a view similar to FIG. 7 showing an alternate embodiment of the connection of the first gear of the counter to the secondary shaft.

DETAILED DESCRIPTION OF THE DRAWINGS

Referring to FIG. 1, the numeral 10 generally designates an agricultural tractor to which is attached a planter unit 12. Planter 12 includes a plurality of planter seed units 14 and a plurality of wheels 16, at least one of which is a drive wheel 18.

Planter unit 12 includes a frame 20 through which a plurality of shafts are journaled which comprise the power train or transmission of the unit. The power train includes a first shaft 22, a second shaft 24, a third shaft 26 and a fourth shaft 28. The longitudinal axes of shafts 22 and 24 are coextensive with one another.

Shaft 22 has a sprocket 30 attached thereto and shaft 24 has a sprocket 32 attached thereto. Shaft 26 has a first sprocket 34 connected thereto and a plurality of second sprockets 36A, 36B, 36C and 36D connected thereto. A plurality of sprockets 38A, 38B, 38C and 38D are attached to shaft 28. A first idler roller chain 40 is trained about sprocket 32 on shaft 24 and sprocket 34 on shaft 26. An adjustable rotating chain guide 42 is provided to maintain proper tension in roller chain 40. A second roller chain 44 is trained about one of sprockets 36A–D on shaft 26 and one of sprockets 38A–D on shaft 28. Adjustable chain guides 46 are provided to maintain the proper tension on chain 44. Removable rubber spacers 48 permit the selected sprocket 36A–D and 38A–D to be aligned with chain guides 46 so that roller chain 44 can be trained thereabout.

Drive wheel 18 is mounted upon an axle 50 to which a sprocket 52 is attached. A third roller chain 54 is trained about sprocket 52 and sprocket 30 of shaft 22. Adjustable rotating chain guides 56 are provided so that the tension in chain 54 can be adjusted.

A clutch 58 is disposed between shafts 22 and 24 to provide selective rotation of the secondary shafts 24, 26 and 28. When clutch 58 is engaged, shaft 24 will rotate along with shaft 22 thereby rotating shafts 26 and 28.

However, when clutch 58 is disengaged, only shaft 22 rotates.

The plurality of interconnected shafts thus constitutes the transmission or power train of planter unit 12. Drive wheel 18 is in contact with the ground and rotates upon axle 50 when planter 12 is pulled behind tractor 10. Axle 50 causes axle 22 to rotate which in turn rotates shaft 24 when clutch 58 is engaged. Rotation of shaft 24 imparts rotation to shaft 26 via chain 40 which in turn rotates shaft 28 via chain 44. Sprocket 34 on shaft 26 is larger than sprocket 32 on shaft 24. Therefore, shaft 26 rotates at a slower speed than does shaft 24. A typical gear ratio is 3:1, that is, shaft 24 rotates three times as fast as shaft 26. It is noted that shaft 24 rotates at the same speed as shaft 22. The speed of shaft 28 depends upon the gear ratio between the sprockets 36A-D and 38A-D about which chain 44 is trained. Shaft 28 is connected to seed dispensing bins 14 such that rotation of shaft 28 causes seeds to be released from the bins at some predetermined rate corresponding to the rotational speed of shaft 28.

The preceding detailed description is for a conventional planter unit having a standard transmission, such as the 7000 Max-Emerge Drawn Planter manufactured by John Deere. The planter unit 12 is old in the art and does not constitute a part of the present invention.

The mechanical acreage counter of the present invention is generally designated by the numeral 60 in the drawings. Counter 60 includes a first gear 62 fixed to the end of second shaft 24, third shaft 26 or fourth shaft 28 for rotation therewith. In the drawings, first gear 62 is shown as being attached to third shaft 26. First gear 62 may be fixed in any convenient manner to any of the secondary shafts 24, 26 or 28 which turn only when clutch 58 is engaged. In the embodiment shown in FIG. 7, gear 62 is fixed to shaft 26 by use of an end cap 64. End cap 64 has a cylidrical body 66 and a closed end 68 from which a spindle 70 extends. Body 66 of cap 64 is attached to shaft 26 by a nut and bolt assembly 72 passing through a hole drilled through shaft 26. The longitudinal axis of spindle 70 coincides with that of shaft 26. First gear 62 is rigidly secured to spindle 70 by cap 64 such that gear 62 rotates in response to rotation of shaft 26.

An alternative manner of connecting gear 62 to shaft 26 is shown in FIG. 8 wherein gear 62 is attached directly to shaft 26 with a lag screw 74 or the like. In this embodiment, shaft 26 may have an end 76 with a reduced cross-sectional area to facilitate in the adjustment of gear 62, as will be explained hereinafter.

Counter 60 also includes a support bracket 78 having a pair of outer slots 80 through which nut and bolt assemblies 82 are secured to connect bracket 78 to frame 20 of planter unit 12. An additional slot 83 is provided in bracket 78 through which spindle 70 of end cap 64 or end 76 of shaft 26 extends. Mounted upon bracket 78 is a conventional odometer 84 having a series of sequentially progressing integer display wheels 85 each depending upon one another. Odometer 84 includes a reset button 86 and a gear 88 mounted which is in operative communication with the series of integer wheels 85. Gear 88 is in meshing combination at all times with gear 62 such that as gear 62 rotates in response to rotation of shaft 26, gear 88 rotates to sequentially advance wheels 85 within counter 84. First gear 62 can be exchanged for similar gears having a different number of gear teeth thereby changing the gear ratio between gear 62 and 88. The gear ratio depends directly upon the number of rows being seeded by planter unit 12 and the width of each row. In other words, increased number of rows and/or increased widths between rows requires additional teeth on gear 62. Similarly, decreased number of rows and/or decreased width between rows requires fewer teeth on gear 62. Thus, by applying the appropriate gear ratio, the number of acres planted with seed can be registered upon counter 84. Bracket 78 can be moved upwardly or downwardly through slots 80 and 83 to accommodate sizes of gear 62 having different number of teeth such that gear 88 is always in mesh with gear 62. The continuous meshing combination of gears 62 and 88 reduces error, wear and failure of counter 60. Preferably, gear 62 is attached to shaft 26 which rotates at $\frac{1}{3}$ the speed of shaft 22, therefore further reducing the wear upon counter 60.

From the foregoing, an improved mechanical acreage counter has been provided which is more accurate and more durable than those previously available.

What is claimed is:

1. A mechanical counter for determining the number of acres of land seeded in combination with an agricultural planter, said planter having a frame, a plurality of planting seed units spaced along the length of said planter for planting rows of seed, a drive wheel engaging said ground, and a power train including a first shaft rotatably driven by said drive wheel, a second shaft, a clutch disposed between said first and second shafts for selectively driving said second shaft, a third shaft driven by said second shaft, and a fourth shaft driven by said third shaft for operating said planting seed units, said seed being deposited from said seed units in response to rotation of said fourth shaft, said counter comprising:
   a counter frame,
   connecting means connecting said counter frame to said planter frame adjacent said third shaft,
   a first gear attached to said third shaft for rotation therewith,
   a second gear mounted on said counter frame in meshing engagement with said first gear, and
   a readout means operatively connected to said second gear to display the number of acres seeded.

2. The counter of claim 1 wherein the gear ratio between said first and second gears can be altered to accommodate varying planting factors.

3. The counter of claim 1 wherein said first gear is one of a plurality of interchangable gears each having a differing number of teeth thereon.

4. The counter of claim 1 wherein said connecting means includes slots in said counter frame whereby said second gear is moved into meshing engagement with said first gear.

5. The counter of claim 1 wherein said second, third and fourth shafts rotate only when said clutch is engaged.

6. The counter of claim 1 wherein said first gear is mounted on a cap member secured to said third gear.

7. The counter of claim 1 wherein said first gear is connected directly to the end of said third shaft.

* * * * *